United States Patent [19]

Fukushige et al.

[11] Patent Number: 5,305,023
[45] Date of Patent: Apr. 19, 1994

[54] MULTICOLOR PRINTING APPARATUS

[75] Inventors: Fumio Fukushige; Masakazu Mizusaki, both of Fukuoka, Japan

[73] Assignee: Matsushita Electric Industrial Co., Ltd., Osaka, Japan

[21] Appl. No.: 28,272

[22] Filed: Mar. 23, 1993

Related U.S. Application Data

[63] Continuation of Ser. No. 684,234, Apr. 12, 1991, abandoned.

[30] Foreign Application Priority Data

Apr. 17, 1990 [JP] Japan .................................. 2-101303

[51] Int. Cl.⁵ .......................... H04N 1/21; B41J 2/435
[52] U.S. Cl. ..................................... 346/108; 346/160; 358/500
[58] Field of Search .................. 346/1.1, 76 L, 107 R, 346/108, 160; 358/75, 296, 300, 302

[56] References Cited

U.S. PATENT DOCUMENTS

| | | | |
|---|---|---|---|
| 4,613,877 | 9/1986 | Spencer et al. | 346/108 |
| 5,043,744 | 8/1991 | Fantuzzo et al. | 346/108 |
| 5,083,140 | 1/1992 | Peterson et al. | 346/108 |

Primary Examiner—Mark J. Reinhart
Attorney, Agent, or Firm—Stevens, Davis, Miller & Mosher

[57] ABSTRACT

In a multicolor printing apparatus in which a laser beam is scanned by a rotary polygon mirror to form an electrostatic latent image on a photosensitive medium, multicolor printing is effected by forming images of individual plural colors. When plane mirrors of the rotary polygon mirror which are used for scanning to form the head lines of images of different colors differ from each other, the difference in plane inclination between plane mirrors causes color shift or misregistration and image deformation. In order to prevent this disadvantage, the same mirror plane of the rotary polygon mirror is managed to be used for scanning to form the head lines of images of different colors.

13 Claims, 4 Drawing Sheets

MULTICOLOR PRINTING APPARATUS

This application is a continuation of application Ser. No. 07/684,234, filed Apr. 12, 1991 (abandoned).

BACKGROUND OF THE INVENTION

1. Field of the Invention

The present invention relates to a multicolor printing apparatus in which electrostatic latent images corresponding to respective multiple colors formed on a photosensitive medium by irradiating laser beams are developed and superimposed to form a multicolor image.

2. Description of the Related Art

FIG. 3 illustrates, in block form, a conventional multicolor printing apparatus. In the Figure, reference numeral 51 designates a photosensitive medium, 52 a start hole for recording formed in the photosensitive medium, 53 a recording start sensor comprised of a photosensor and operable to detect the start hole 52, 54 a laser diode, 55 a beam drive for driving the laser diode 54, 56 a rotary polygon mirror comprised of six plane mirrors M1 to M6 and a motor 57, 58 a photo-sensor, 59 a scanning start pulse generator operable to generate a scanning start pulse in synchronism with a signal from the photo-sensor 58, 60 an image signal deliverer responsive to an image signal from a host computer, not shown, an the signal from the scanning start pulse generator 59 to deliver an image signal, 61 an Fθ lens, 62 a timing pulse operable to generate a timing pulse synchronism in with rotation of the motor 57 of the rotary polygon mirror 56, and 63 a rotary polygon mirror drive adapted to control driving of the motor 57 of the rotary polygon mirror 56. The drive 63 includes an oscillator 64 operable to generate oscillating signals at a constant period, a comparator 65 for comparing phases of a signal from the oscillator 64 and a signal from the timing pulse generator 62 and a drive 66 responsive to a signal from the comparator 65 to drive the motor 57 of the rotary polygon mirror 56.

The scanning unit constructed as above operates as will be described below with reference to a timing chart of FIG. 4.

When a start signal (not shown) is first supplied externally to the drive 66, the motor 57 of the rotary polygon mirror 56 starts rotating and a signal in synchronism with the rotation is supplied from the timing pulse generator 62 to the comparator 65 of the rotary polygon mirror drive 63. The comparator 65 then compares phases of the signals from the timing pulse generator 62 and oscillator 64 and sends a difference signal to the drive 66, causing it to drive rotation of the motor 57 of the rotary polygon mirror 56. Thus, the signal from the timing pulse generator 62 is so controlled as to be synchronous with the oscillation period and consequently the rotary polygon mirror can always be rotated at a uniform speed.

Subsequently, the beam drive 55 drives the laser diode 54 and at the same time a laser beam is irradiated on the plane mirror M1 of the rotary polygon mirror 56 and deflected for scanning in synchronism with the rotation of the rotary polygon mirror 56. At the time that a reflected scanning beam passes through the photo-sensor 58 which is so located as to precede the commencement of scanning the photosensitive medium 51, the scanning start pulse generator 59 generates a scanning start pulse as shown at a in FIG. 4.

On the other hand, as the photosensitive medium 51 rotates and the start hole 52 in the photosensitive medium passes by the recording start position sensor 53, a recording start position signal b1 as shown at b in FIG. 4 is generated.

The scanning start pulse a and recording start position signal b are applied to the image signal deliverer 60. After receiving the recording start position signal b1, the image signal deliverer 60 starts delivering an image signal as shown at c in FIG. 4 to the drive 55 in synchronism with the timing for a scanning start signal a1 reaching t1 time later. Then, the beam drive 55 drives the laser diode 54 to cause it to emit a beam for recording. The beam is scanned by the rotary polygon mirror 56 and passed through the Fθ lens 61 to form a record of one line on the photosensitive medium 51.

Since the rotary polygon mirror 56 rotates at the uniform speed, the respective succeeding lines are sequentially recorded on the photosensitive medium by means of the plane mirrors M2 to M6 in a similar way, completing a record of one frame.

For multicolor printing, superimposition of data of different colors is needed and therefore, as the photosensitive medium 51 makes a revolution, the passage of the start hole 52 is detected by the recording start position detecting sensor 53 in a similar manner to the previously described image recording process and a recording start position signal b2 is supplied to the image signal generator 60 which in turn starts delivering an image signal as shown at c in FIG. 4 to the beam drive 55 in synchronism with the timing for a scanning start signal a2 reaching t2 time later, thereby completing one frame of printing of the second color in a similar way.

In this manner, superimposition of frames is carried out by the frequency corresponding to the number of recording colors and thereafter a resulting frame is transferred to paper to complete multicolor printing.

SUMMARY OF THE INVENTION

An object of the invention is to provide a multicolor printing apparatus which can detect the rotational position of a rotary polygon mirror after detecting that a photosensitive medium reaches a predetermined position and can control the rotation speed of the rotary polygon mirror in accordance with the difference between detection times.

Another object of the invention is to provide a multicolor printing apparatus which can start forming an image of a second color from a plane mirror of the rotary polygon mirror at which the formation f an image of a first color is started.

Still another object of the invention is to provide a multicolor printing apparatus which can control the rotation speed of the rotary polygon mirror during an interval of time beginning when the photosensitive medium reaches a predetermined position and ending when it reaches a printing start position so that the formation of image may be started with the rotary polygon mirror controlled to a constant rotation speed.

DESCRIPTION OF THE PREFERRED EMBODIMENTS

A preferred embodiment of a multicolor printing apparatus according to the invention will now be described in detail.

Figure 1:
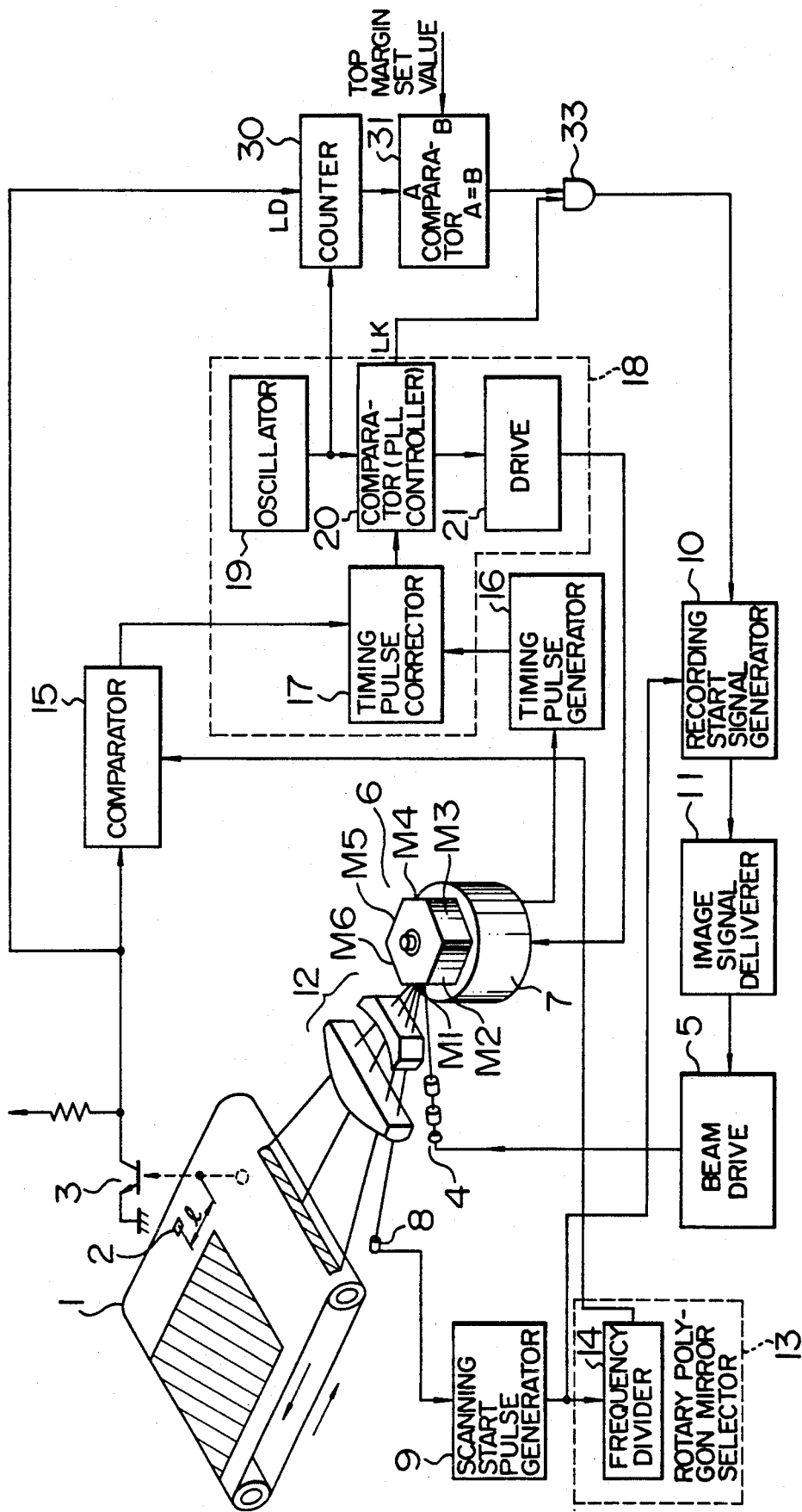
FIG. 1 is a schematic diagram showing an embodiment of a multicolor printing apparatus according to the invention.
Figure 2:
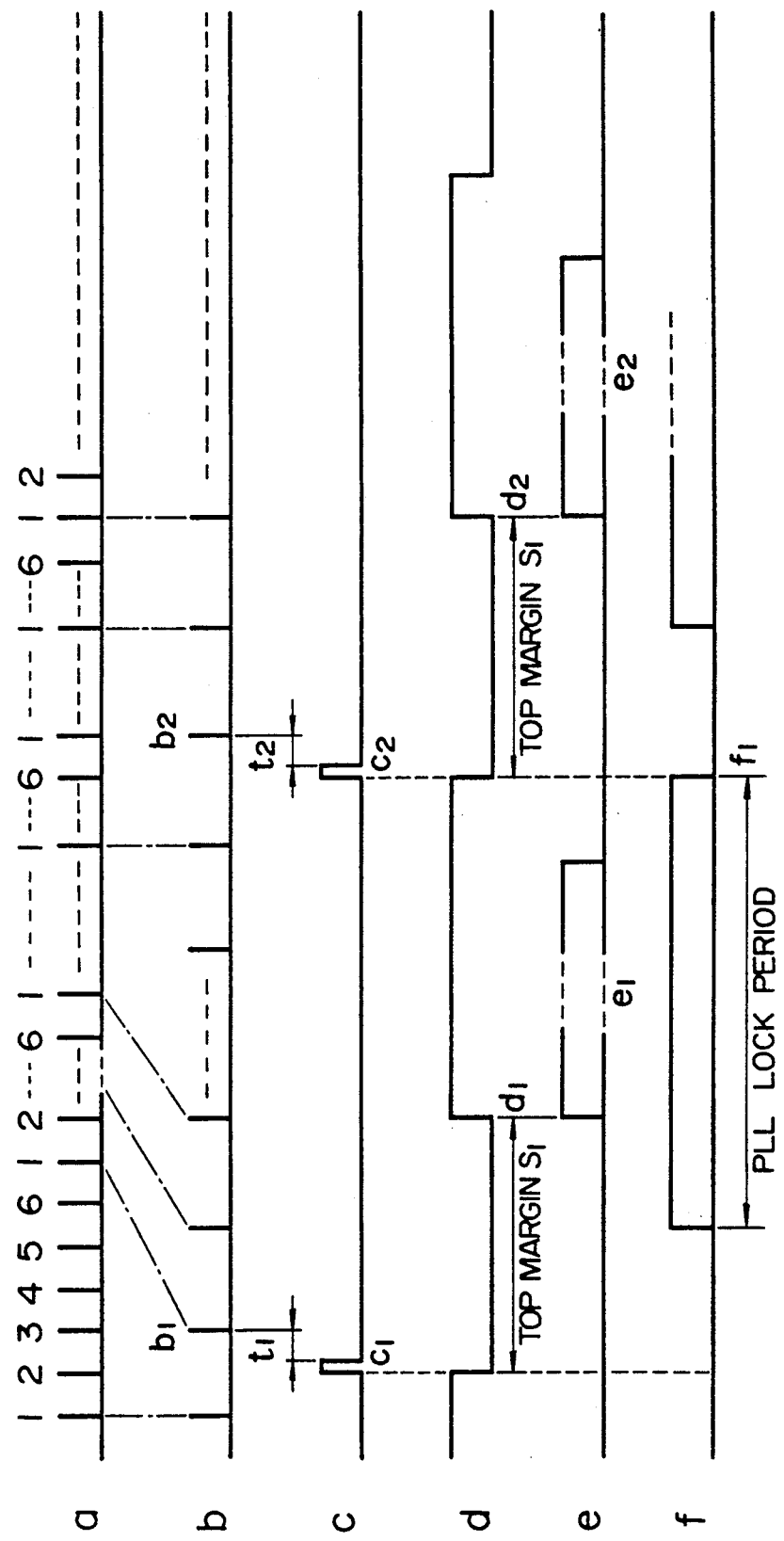
FIG. 2 is a timing chart for the embodiment of the multicolor printing apparatus.
Figure 3:
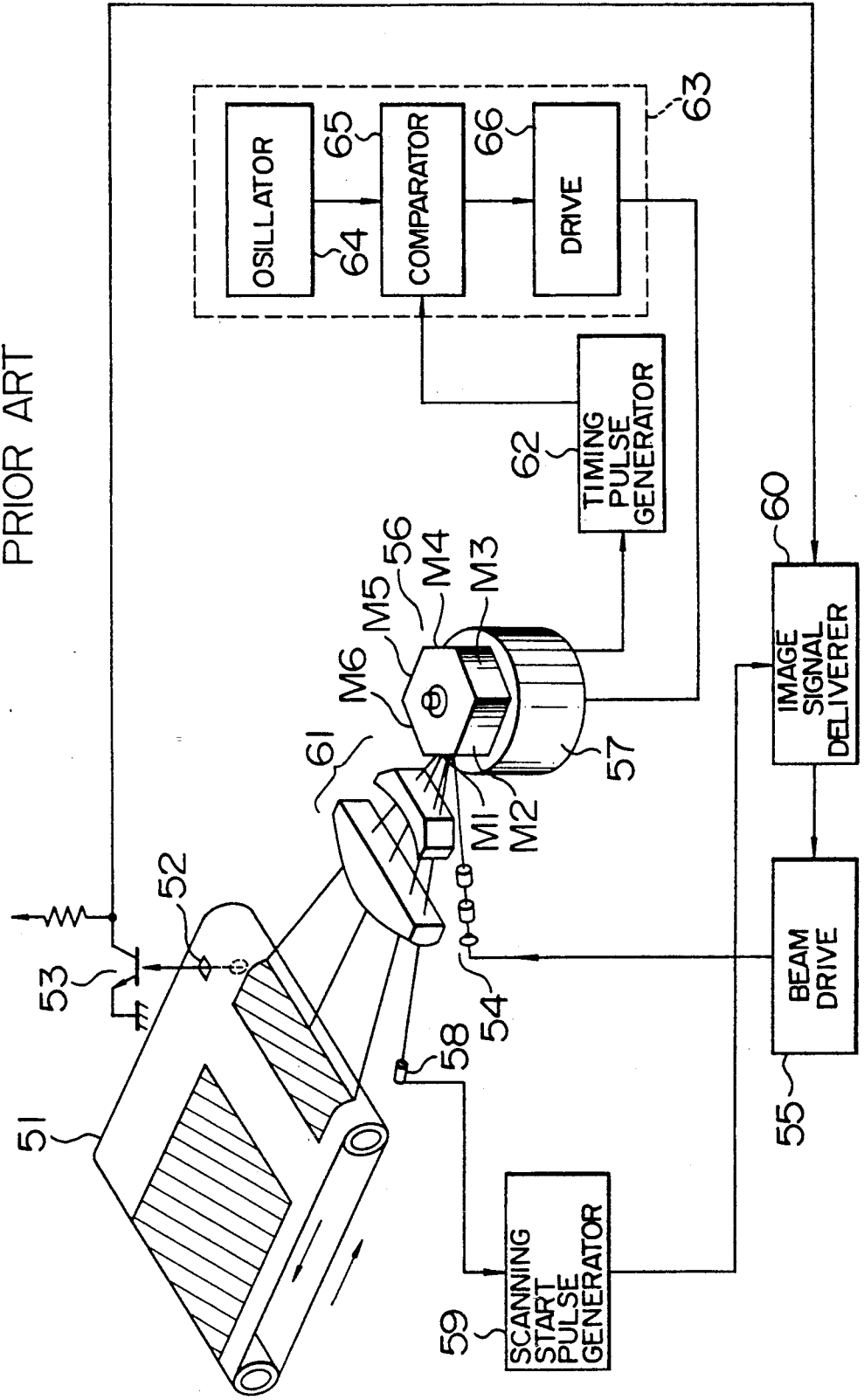
FIG. 3 is a schematic diagram showing a conventional multicolor printing apparatus.
Figure 4:
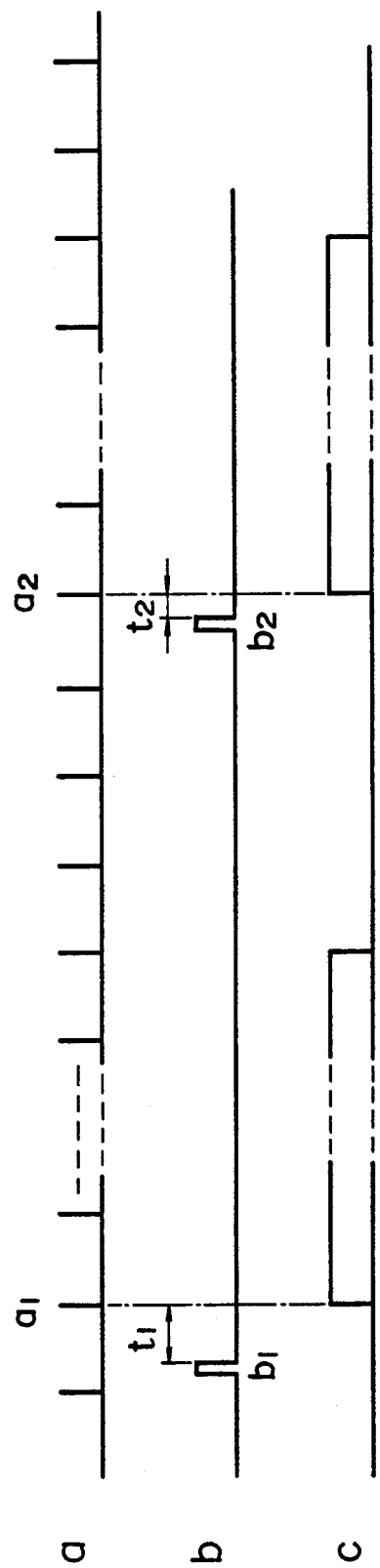
FIG. 4 is a timing chart for the conventional multicolor printing apparatus.

FIG. 1 schematically shows the multicolor printing apparatus of the invention and FIG. 2 shows a timing chart. In FIG. 1, reference numeral 1 designates a photosensitive medium, 2 a reference position hole formed in the photosensitive medium, 3 a reference position detecting sensor comprised of a photo-sensor and operable to detect the reference position 2, 4 a laser diode, 5 a beam drive for driving the laser diode 4, 6 a rotary polygon mirror comprised of plane mirrors M1 to M6 and a motor 7, 8 a photo-sensor, 9 a scanning start pulse generator operable to generate a scanning start pulse in synchronism with a signal from the photo-sensor 8, 10 a recording start signal generator connected to receive the signal from the scanning start pulse generator 9 and operable to deliver a recording start signal at the expiration of predetermined counts following the generation of the signal from the reference position detecting sensor 3, 11 an image signal deliverer responsive to an image signal from a host computer (not shown) and the signal from the recording start signal generator 10 to deliver an image signal, 12 an F$\theta$ lens, 13 a rotary polygon mirror selector comprised of a frequency divider 14 for frequency division of the signal from the scanning start pulse generator 9 and operable to select a plane mirror of the rotary polygon mirror 6, 15 a comparator for comparing phases of the signals of the reference position detecting sensor 3 and rotary polygon mirror selector 13 to produce a difference signal, 16 a timing pulse generator operable to generate a timing pulse in synchronism with rotation of the motor 7 of the rotary polygon mirror 6, 17 a timing pulse corrector for correcting the signal from the timing pulse generator 16 with the signal from the comparator 15, and 18 a rotary polygon mirror drive controller adapted to control driving of the motor 7 of the rotary polygon mirror 6. The controller 18 includes an oscillator 19 operable to generate oscillating signals at a constant period, a comparator 20 for comparing phases of signals of the oscillator 19 and timing pulse corrector 17 and a drive 21 responsive to an output signal from the comparator 20 to drive the motor 7 of the rotary polygon mirror 6. Denoted by 30 is a counter for counting pulses from the oscillator 19. The counter 30 is reset by receiving the signal from reference position sensor 3 indicative of detection of the reference position hole 2 formed in the photosensitive medium 1. In other words, the counter 30 is reset and caused to start counting from "0" each time that the reference position hole 2 arrives at the position of the reference position sensor 3. Denoted by 31 is a comparator. The comparator 31 compares a set value (top margin set value) applied in advance and a count value of the counter 30 to produce a high level signal when the count value of the counter 30 is larger than the other. The top margin set value prescribes the number of pulses delivered out of the oscillator 19 during the time required for the photosensitive medium 1 to move by a distance l from the reference position hole 2 now taking the position in register with the sensor 3 to the recording start position. Denoted by 33 is an AND gate. The AND gate 33 produces a logical product of the high level signal from the comparator 31 and a signal indicative of the phase locked condition achieved by the comparator 20.

Accordingly, the comparator 15 compares the time that the reference position hole 2 is detected by the reference position sensor 3 with the corresponding rotational phase of the rotary polygon mirror 6, the rotational phase of the rotary polygon mirror 6 is corrected before the photosensitive medium 1 moves by the distance l to reach the printing start position, and under the condition that the phase correction is completed to set up the uniform speed rotational state and the photosensitive medium has reached the printing start position the high level signal is delivered out of the AND gate 33.

The scanning unit constructed as above operates as will be described with reference to a timing chart of FIG. 2.

When a start signal (not shown) is first applied externally to the drive 21 of the rotary polygon mirror drive controller 18, the motor 7 of the rotary polygon mirror 6 starts rotating and a signal in synchronism with the rotation is supplied from the timing pulse generator 16 to the timing pulse corrector 17 of the rotary polygon mirror drive controller 18. Then the beam drive 5 drives the laser diode 4 and at the same time a laser beam is irradiated on the plane mirror M1 of the rotary polygon mirror 6 and reflected for scanning in synchronism with the rotation of the rotary polygon mirror 6. At the time that a reflected scanning beam passes through the photo-sensor 8 which is so located as to precede the commencement of scanning the photosensitive medium 1, the scanning start pulse generator 9 operable synchronous with the photo-sensor 8 generates a scanning start pulse as shown at a in FIG. 2. The signal from the scanning start pulse generator 9 is applied to the frequency divider 14 of the rotary polygon mirror selector 13 so as to be subjected to frequency division by the number of plane mirrors of the rotary polygon mirror 6, thereby delivering a signal as shown at b in FIG. 2. On the other hand, as the photosensitive medium 1 rotates and the reference position hole 2 in the photosensitive medium passes by the reference position detecting sensor 3, a reference position signal c1 as shown at c in FIG. 2 is generated.

The reference position signal c and rotary polygon mirror selecting signal b are applied to the comparator 15 which in turn compares the phases to provide a time difference of t1 and sends the difference signal to the timing pulse corrector 17, whereby pulses from the timing pulse generator 16 are corrected in frequency in accordance with the output signal from the comparator 15.

Phases of the signals from the oscillator 19 and timing pulse corrector 17 are also compared by the comparator 20 and a difference signal is sent to the drive 21 to cause it to control rotational driving of the motor 7 of the rotary polygon mirror 6 within the non-printing region.

Thus, the rotation of the rotary polygon mirror is controlled such that the signal of the rotary polygon mirror selector 13 is rendered to be synchronous with the signal of the reference position detecting sensor 3.

The reference position signal from the reference position detecting sensor 3 is applied to the load terminal of the counter 30, causing it to start counting pulses from the oscillator 19. It is stipulated herein that the pulse frequency of the oscillator 19 should be sufficiently higher than that of the scanning start pulse generator. The count value of the counter 30 is compared by the comparator 31 with the top margin value set in advance and when coincidence occurs, the comparator 31 delivers a recording start position signal d which is applied to the recording start signal generator 10 through the AND gate 33. Accordingly, at the expiration of predetermined time (top margin value) following the generation of the reference position signal, recording of each color is started. The comparator 20 compares phases of the timing pulse correction signal and reference signal and at the time that the phase locked condition is established, a phase locked signal f is generated and applied to the AND gate. Therefore the top margin value should be sufficiently longer than the time required for establishment of the phase locked condition.

When receiving the logical product of recording start position signal d1 and phase locked conditions signal f1, the image signal deliverer 11 starts delivering an image signal e1 as shown at e in FIG. 2 to the beam drive 5 which in turn drives the laser diode 4 to cause it to emit a beam for recording. The beam is sequentially scanned by the plane mirrors M1 to M6 of the rotary polygon mirror 6 and passed through the F$\theta$ lens 12 so that recording for individual lines may be carried out on the photosensitive medium 1 to complete a record of one frame.

For multicolor printing, superimposition of data of different colors is needed and therefore, as the photosensitive medium 1 makes a revolution, the passage of the reference position hole 2 is detected by the reference position detecting sensor 3 to provide a reference position detecting signal c2 as in the case of the previously described image recording process, the rotation number of the rotary polygon mirror 6 is corrected in accordance with the time difference between a reference position signal c2 and a signal b2 from the rotary polygon mirror selector 13, and subsequently a recording start signal d2 is supplied from the recording start signal generator 10 to the image signal deliverer 11 which in turn starts delivering an image signal as shown at e in FIG. 2 to the beam drive 5 thereby completing one frame of printing of the second color in a similar way.

In this manner, superimposition of frames is carried out by the frequency corresponding to the number of recording colors and thereafter a resulting frame is developed and transferred to paper to complete multicolor printing.

As described above, according to the present embodiment, thanks to the provision of the rotary polygon mirror selector for detecting and selecting a plane mirror of the rotary polygon mirror, reference position detector formed in the photosensitive medium and drive/control means for comparing timings of a detected signal from the reference position detector and a detected signal from the rotary polygon mirror detector and controlling driving of the rotary polygon mirror such that recording on the photosensitive medium for superimposition of different colors can always be started in timed relationship with the same plane mirror, recording of different colors can always be started at the same plane mirror of the rotary polygon mirror, thus making it possible to improve accuracy of superimposition of colors onto the photosensitive medium and obtain a multicolor image of high quality.

The present embodiment has been described by way of the superimposition of multicolor toner images of different colors formed on the photosensitive medium, requiring that the reference position hole be formed in the photosensitive medium but in a scheme wherein toner images of different colors are formed sequentially at different positions on the photosensitive medium and the toner images of different colors are transferred for superimposition to a transfer medium, the reference position hole may be formed in the transfer medium to attain similar effects.

As described above, in the present invention, there are provided means for detecting a predetermined position of the photosensitive medium and means for detecting a predetermined rotational position of the rotary polygon mirror, and the rotation speed of the rotary polygon mirror is controlled in accordance with the difference between times for detection by these means. Accordingly, the formation of latent images can be started at a predetermined plane mirror of the rotary polygon mirror adapted to scan the laser beam for the sake of forming latent images on the photosensitive medium and hence, even when inclinations of individual plane mirrors of the rotary polygon mirror differ from each other, scanning planes of scanning lines for different colors can be held in register for superimposed printing and color shifting or misregistration can be minimized.

We claim:

1. A multicolor printing apparatus for printing a color picture having a plurality of color components on a transfer medium by forming an electrostatic latent image corresponding to one of said plurality of color components by a laser beam, developing the electrostatic latent image to produce a developed image, superimposing the developed image on said transfer medium, and iterating for all others of said plurality of color components to form the color picture, said multicolor printing apparatus comprising:

a rotatable photosensitive medium for forming an electrostatic latent image of one after another of said plurality of color components of said picture on a same position at every new rotation;

light emitting means for emitting said laser beam;

a rotary polygon mirror having a plurality of plane mirror surfaces for scanning the laser beam from said light emitting means in a direction orthogonal to a direction of rotation of said photosensitive medium;

first detection means for detecting a first timing when said photosensitive medium reaches a predetermined position;

second detection means for detecting a second timing when a predetermined one of said plurality of plane mirror surfaces of said rotary polygon mirror reflects said laser beam, said second detection means including a photosensor located at a fixed position for sensing laser beams reflected from said plurality of plane mirror surfaces to provide a sensing signal and means for recognizing said second timing based on said sensing signal; and control means for controlling a rotation speed of said rotary polygon mirror in accordance with a difference between said first and second timings so that the laser beam for the first scanning line in every one of said plurality of color components of the picture is reflected on a same lane mirror surface.

2. A multicolor printing apparatus according to claim 1 wherein said control means is operative to make a rotational phase of said photosensitive medium coincident to a rotational phase of said rotary polygon mirror for each of a plurality of different colors before said photosensitive medium reaches a printing start position.

3. A multicolor printing apparatus according to claim 1 further comprising an image signal deliverer responsive to a signal from said control means indicating that said rotary polygon mirror rotates at a predetermined speed to deliver image data.

4. A multicolor printing apparatus for printing a color picture having a plurality of color components on a transfer medium by forming an electrostatic latent image corresponding to one of said plurality of color components by a laser beam, developing the electrostatic latent image to produce a developed image, superimposing the developed image on said transfer medium, and iterating for all others of said plurality of color components to form the color picture, said multicolor printing apparatus comprising:

a movable photosensitive medium for forming an electrostatic latent image of one after another of said plurality of color components of said picture on a same position;

light emitting means for emitting said laser beam;

a rotary polygon mirror having a plurality of plane mirror surfaces for scanning the laser beam from said light emitting means in a direction orthogonal to a direction of movement of said photosensitive medium;

first detection means for detecting a first timing when said photosensitive medium reaches a predetermined position;

second detection means for detecting a second timing when a predetermined one of said plurality of plane mirror surfaces of said rotary polygon mirror reflects said laser beam, said second detection means including a photosensor located at a fixed position for sensing laser beams reflected from said plurality of plane mirror surfaces to provide a sensing signal and means for recognizing said second timing based on said sensing signal; and control means for controlling a rotation speed of said rotary polygon mirror in accordance with a difference between said first and second timings so that the laser beam for the first scanning line in every color component of the picture is reflected on a same plane mirror surface.

5. A multicolor printing apparatus according to claim 4 wherein said control means is operative to make a movement phase of said photosensitive medium coincident to a rotational phase of said rotary polygon mirror for each of a plurality of different colors before said photosensitive medium reaches a printing start position.

6. A multicolor printing apparatus according to claim 4 further comprising an image signal deliverer responsive to a signal from said control means indicating that said rotary polygon mirror rotates at a constant speed to deliver image data.

7. A multicolor printing apparatus for printing a color picture having a plurality of color components on a transfer medium by forming an electrostatic latent image of a first one of said plurality of color components by a laser beam, developing the electrostatic latent image to produce a developed image, superimposing the developed image on said transfer medium, and iterating for second and ensuing ones of said plurality of color components to form the color picture, said multicolor printing apparatus comprising:

a movable photosensitive medium;

light emitting means for emitting said laser beam;

a rotary polygon mirror for scanning the laser beam from said light emitting means in a direction orthogonal to the direction of movement of said photosensitive medium;

first detection means for detecting a timing when said photosensitive medium reaches a predetermined position; and timing control means operable to control the generation of light by said light emitting means after said timing detected by said first detection means, so as to start the formation of an image of said first one of said plurality of color components on said photosensitive medium and to start the formation of images of said second and ensuing ones of said plurality of color components from a plane mirror of said rotary polygon mirror at which the formation of the image of first color is started.

8. A multicolor printing apparatus according to claim 7 wherein said timing control means includes a corrector for changing the rotation speed of said rotary polygon mirror before the formation of the image of second color is started.

9. A multicolor printing apparatus according to claim 7 wherein said photosensitive medium has the form of an endless belt.

10. A multicolor printing apparatus for printing a color picture having a plurality of color components on a transfer medium by forming an electrostatic latent image corresponding to one of said plurality of color components by a laser beam, developing the electrostatic latent image to produce a developed image, superimposing the developed image on said transfer medium, and iterating for all others of said plurality of color components to form the color picture, said multicolor printing apparatus comprising:

a movable photosensitive medium for forming an electrostatic latent image of one after another of said plurality of color components of said picture on a same position;

light emitting means for emitting said laser beam;

a rotary polygon mirror having a plurality of plane mirror surfaces for scanning the laser beam from said light emitting means in a direction orthogonal to a direction of movement of said photosensitive medium;

first detection means for detecting a first timing when said photosensitive medium reaches a predetermined position;

second detection means for detecting a second timing when a predetermined one of said plurality of plane mirror surfaces of said rotary polygon mirror reflects said laser beam, said second detection means including a photosensor located at a fixed position for sensing laser beams reflected from said plurality of plane mirror surfaces to provide a sensing signal and means for recognizing said second timing based on said sensing signal;

comparison means for determining a time difference between said first timing and said second timing;

control means for controlling a rotation speed of said rotary polygon mirror in accordance with a result of comparison by said comparison means so that the laser beam for the first scanning line in every one of said color components of the picture is reflected on a same plane mirror surface; and means for driving said light emitting means so as to form image data individually of individual ones of said plurality of color components under a condition that said rotary polygon mirror is controlled by said control means to rotate at a predetermined speed.

11. A multicolor printing apparatus according to claim 10 wherein said photosensitive medium has the form of an endless belt having a hole at a predetermined position, and said first detection means detects said hole.

12. A multicolor printing apparatus for printing a color picture having a plurality of color components including first, second and ensuing color components on a transfer medium by forming an electrostatic latent image corresponding to a first one of said color components by a laser beam, developing the electrostatic latent image to produce a developed image, superimposing the developed image on said transfer medium, and iterating for second and ensuing ones of said color components to form the color picture, the multicolor printing apparatus comprising:

a movable photosensitive medium for forming an electrostatic latent image of one color component after another of the picture on a same position;

light emitting means for emitting a laser beam;

a rotary polygon mirror having a plurality of plane mirror surfaces for scanning the laser beam from said light emitting means in a direction orthogonal to a direction of movement of said photosensitive medium;

first detection means for detecting a first timing when said photosensitive medium reaches a predetermined position;

second detection means for detecting a second timing when a predetermined one of said plurality of plane mirror surfaces of said rotary polygon mirror reflects said laser beam, said second detection means including a photosensor located at a fixed position for sensing laser beams reflected from said plurality of plane mirror surfaces to provide a sensing signal and means for recognizing said second timing based on said sensing signal;

comparison means for determining a time difference between said first timing and said second timing;

control means for controlling a rotation speed of said rotary polygon mirror in accordance with a result of comparison by said comparison means before commencing formation of images so as to start formation of images of the second and ensuing color components onto said photosensitive medium from a same plane mirror surface of said rotary polygon mirror at which formation of an image of the first color component is started; and means for driving said light emitting means so as to form image data individually of individual ones of said plurality of color components.

13. A multicolor printing apparatus for printing a color picture having a plurality of color components including first, second and ensuing color components on a transfer medium by forming an electrostatic latent image corresponding to a first one of said plurality of color components by a laser beam, developing the electrostatic latent image to produce a developed image, superimposing the developed image on said transfer medium, and iterating for second and ensuing ones of said plurality of color components to form the color picture, said multicolor printing apparatus comprising:

a movable photosensitive medium for forming an electrostatic latent image of one after another of said plurality of color components of said picture on a same position;

a light emitting means for emitting said laser beam;

a rotary polygon mirror having a plurality of plane mirror surfaces for scanning the laser beam from said light emitting means in a direction orthogonal to a direction of movement of said photosensitive medium;

first detection means for detecting a timing when said photosensitive medium reaches a predetermined position and providing a first detection signal;

second detection means for providing a second detection signal only when a predetermined one of said plurality of plane mirror surfaces of said rotary polygon mirror reflects said laser beam, said second detection means including a photosensor located at a fixed position for sensing laser beams reflected from said plurality of plane mirror surfaces to provide a sensing signal and means for producing said second detection signal based on said sensing signal;

comparison means for determining a time difference between said first detection signal from said first detection means and said second detection signal from said second detection means;

control means for controlling a rotation speed of said rotary polygon mirror in accordance with a result of comparison by said comparison means before commencing formation of images so as to start formation of images of the second and ensuing ones of said color components onto said photosensitive medium from a same plane mirror surface of said rotary polygon mirror at which formation of an image of the first color component is started; and means for driving said light emitting means so as to form image data individually of individual ones of said plurality of color components.

* * * * *